United States Patent Office 3,144,216
Patented Aug. 11, 1964

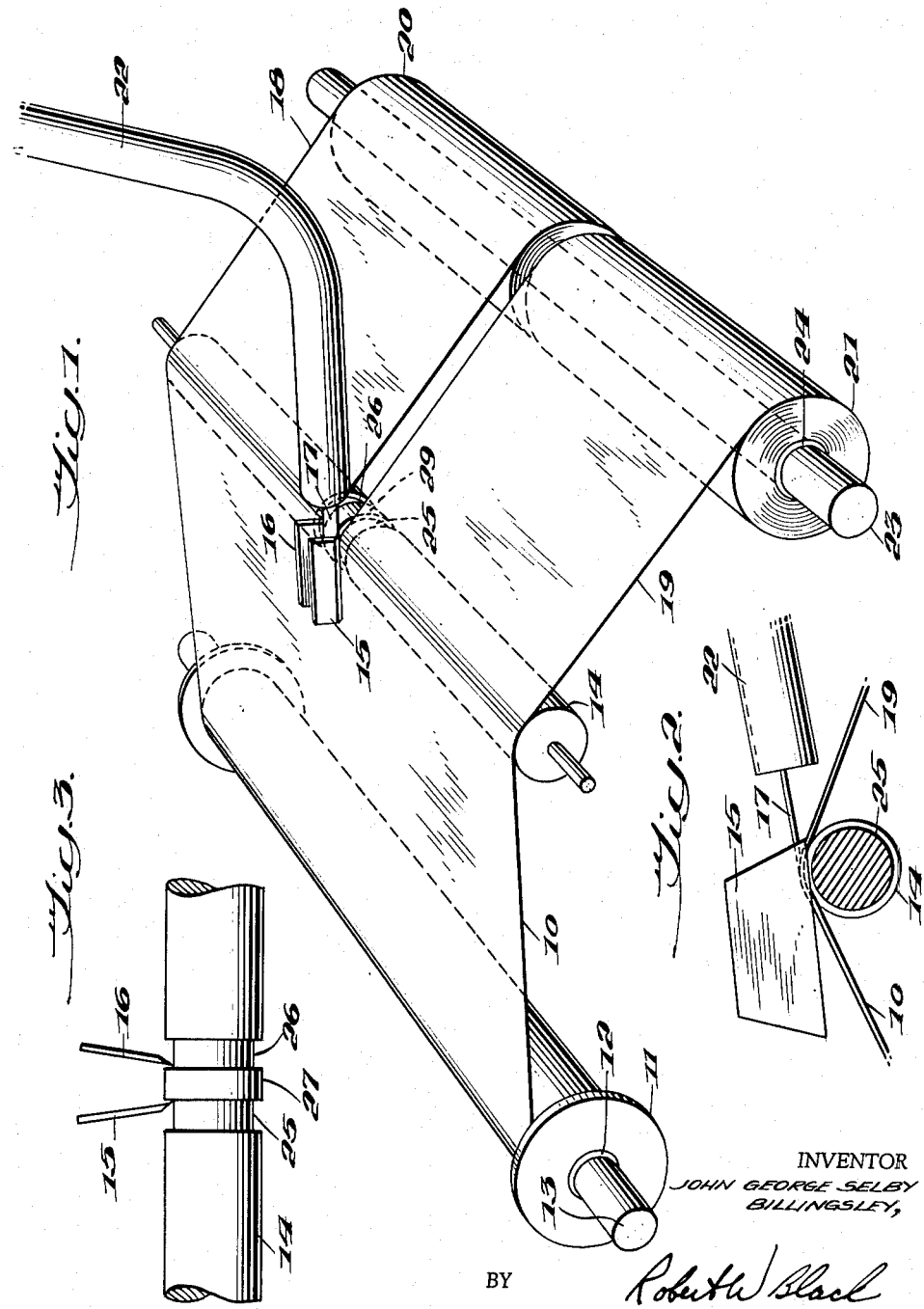

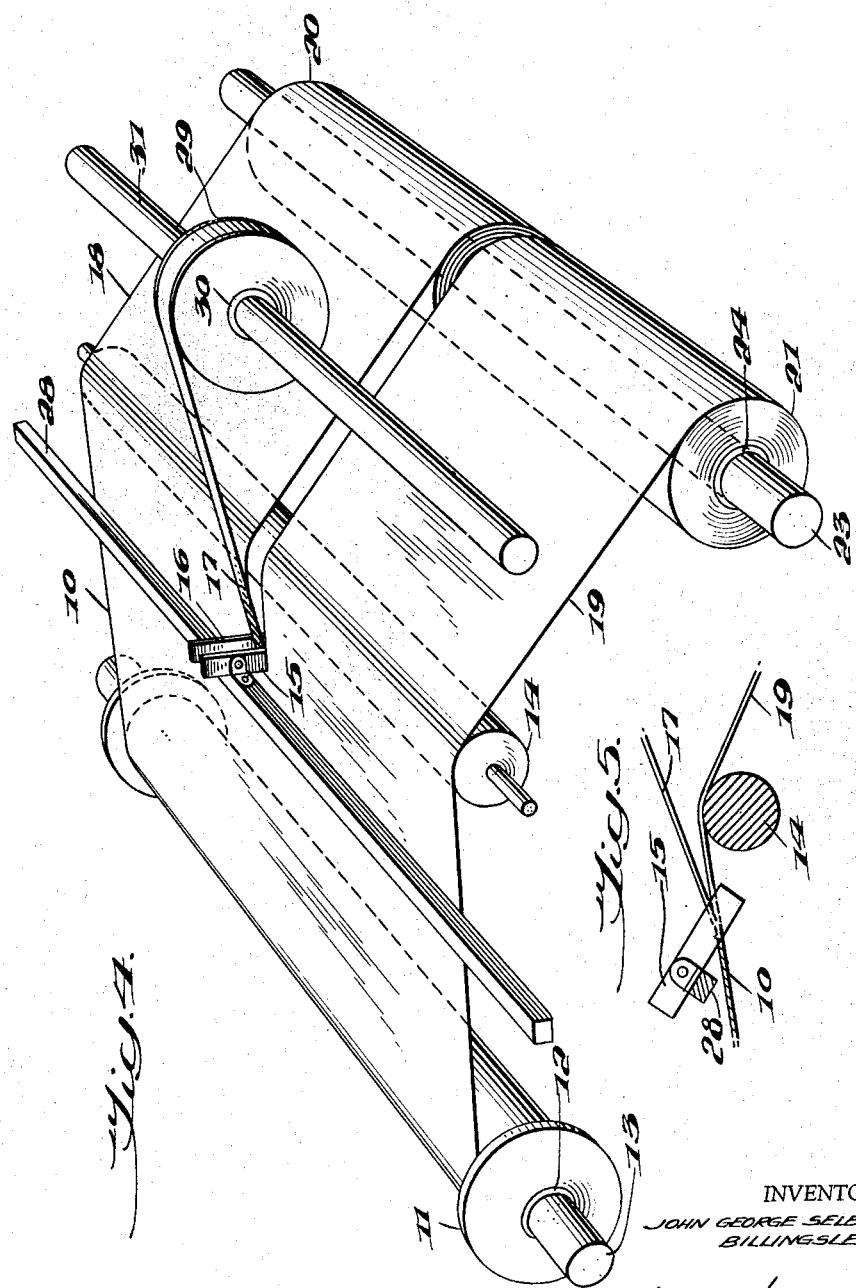

3,144,216
APPARATUS FOR SLITTING FILM AND REMOVING THE STRIPS FROM THE CUTTING ZONE UNDER UNEQUAL TENSION
John George Selby Billingsley, Newark, Del., assignor to E. I. du Pont de Nemours and Company, Wilmington, Del., a corporation of Delaware
Filed Sept. 12, 1961, Ser. No. 137,583
5 Claims. (Cl. 242—56.4)

This invention relates to a film slitting apparatus and more particularly to an improvement in apparatus for slitting non-fibrous film into strips which are removed from the cutting zone under unequal tension.

In the manufacture of film such as regenerated cellulose where mill rolls are slit and wound into slit rolls, the slitting operation is simplest and encounters no unusual difficulty when all of the strips of film obtained from a mill roll are wound into slit rolls by two wind-up mandrels, since uniform tension is applied across the mill roll sheet at it unwinds and to the strips of film being wound into slit rolls. However, it is often desirable to remove one or more thin strips of film from the cutting zone by means other than the wind-up mandrels. For example, defective edge lanes of film ("edge trim") are removed by a vacuum line, are collected in bulk form, compressed into bales and sold for use as decorative material or an excelsior for stuffing or packaging. This method of removing "edge trim" has been reasonably successful.

All attempts, however, to use a vacuum line for removing narrow strips of film of one-inch or less in width slit from inner lanes of a mill roll sheet ("inner trim") have been unsuccessful, since strips of "inner trim" break within a few minutes of operation regardless of whether the tension applied to the "inner trim" by the vacuum line is high or low. It appears that when a high vacuum is used the "inner trim" is broken by the high fluctuating tension; when a low vacuum is used the "inner trim" frequently jams momentarily between the slitting blades as a result of the low fluctuating tension and this causes the "inner trim" to tear.

It is therefore an object of this invention to provide a film slitting apparatus.

It is a further object of this invention to provide an apparatus for removing "inner trim" from the cutting zone of a slitting machine by means independent of the "slit roll" winding means.

A still further object is to provide an apparatus for removing "inner trim" from the cutting zone of a slitting machine under fluctuating tension and under a lower average tension than the two adjacent film strips.

Yet another object is to provide an apparatus for removing "inner trim" from the cutting zone of a slitting machine so that a single mandrel can be used to wind all of the "slit rolls" being formed using cores longer than the width of the corresponding strip of film. These and other objects will appear hereinafter.

The above-mentioned objects are accomplished by this invention which comprises slitting a continuous film longitudinally under tension into a series of strips using slitting knives, wherein two adjacent slitting knives form a cutting zone and are inclined away from each other to form an angle of at least 0.5 degree between their adjacent cutting planes; winding at least some of said strips into roll form on a wind-up mandrel under tension; and independently removing the strip of film passing through said cutting zone under a tension lower than the tension applied to said wind-up mandrel.

The following discussion is given to explain the term "cutting plane" as used in defining this invention:

A cutting plane of a knife is a plane that includes the cutting edge and a portion of surface of the knife; thus, a knife has two cutting planes. Each of the beveled faces of a double or single beveled knife is a cutting plane; while the straight, unbeveled side of a single beveled knife is also a cutting plane. In the special case of a knife having its cutting edge formed by one or more curved, ground surface, the cutting plane on each curved side is the plane passing through the cutting edge at a tangent to the curved surface at the cutting edge.

The present invention can be better understood by referring to the accompanying drawings, in which:

FIGURE 1 is a digrammatic, perspective view of one arrangement of apparatus suitable for carrying out this invention;

FIGURE 2 is a fragmentary side elevational view of the cutting zone of the apparatus shown in FIGURE 1;

FIGURE 3 is a fragmentary front elevational view of the cutting zone of the apparatus shown in FIGURE 1;

FIGURE 4 is a diagrammatic, perspective view of another apparatus which can be used in carrying out this invention; and FIGURE 5 is a fragmentary side elevational view of the cutting zone of the apparatus shown in FIGURE 4.

Referring to FIGURES 1 and 2, a continuous sheet of film 10 is unwound under constant tension from "mill" roll 11 contained on core 12 which is mounted on the unwind mandrel 13 and passes into the cutting zone over grooved support roll 14 where it is slit longitudinally into two wide strips 18 and 19 and a narrow strip 17 from between them by the two thin slitting knives 15 and 16, the cutting edges of which project into the path of travel of the film and into grooves 25 and 26, respectively. The knives 15 and 16 are positioned so that their cutting edges are essentially parallel to each other and to the path of travel of the film, but with their adjacent cutting planes inclined away from each other at an angle of at least 0.5 degree, preferably 0.5 to 4 degrees.

As the film strips leave the cutting zone, the wide strips 18 and 19 are wound into "slit" rolls 20 and 21 by the wind-up mandrel 23 under a uniformly controlled tension over the range of 0.7 to 2 lbs./in. of width on cores of greater length than the width of the corresponding film strip. The narrow strip of film 17 is drawn from the cutting zone through the vacuum line 22 to which is supplied just sufficient negative pressure to apply a very slight tension to film strip 17 as it enters into the end of vacuum line 22 which is in close proximity to the slitting site. The film strip 17 flutters considerably as it passes into vacuum line 22, which indicates not only that the tension is rather low but also fluctuating.

Even though film strip 17 is drawn from the cutting zone under low tension, it may break occasionally, especially when that particular lane of film is defective. This, however, will not interrupt the slitting operation since the broken end of film strip 17 will be immediately sucked into vaccum line 22 due to the proper positioning of the knives 15 and 16 and the entrance end of vacuum line 22.

The preferred type of slitting knives and their preferred positioning are illustrated in FIGURE 3 which shows a front view of a section of the cutting zone and an end view of the slitting knives. Means for holding the knives in position are not shown. As can be seen from this drawing, the slitting knives, 15 and 16 are thin, straight, single beveled knives positioned with their unbeveled sides adjacent, with their cutting edges essentially parallel and projecting slightly into grooves 25 and 26, respectively, of grooved support roll 14. The cutting edges of the knives come into close proximity to, but out of contact with, raised portion 27 of grooved support roll 14. Most important, however, is the positioning of the blades so that each of their adjacent cutting planes is inclined away from the perpendicular to grooved support roll 14 to form an angle of at least 0.25 degree; thus, the total angle between the two adjacent cutting planes is at least 0.5 degree.

FIGURES 4 and 5 show another apparatus which can be used in accordance with this invention and which is particularly useful for slitting out fragile "inner trim" from a "mill" roll and to winding it into a loose roll at a lower tension than the tension being applied to the two adjacent film strips. In general, the principle of operation of the machine is similar to that of the apparatus illustrated in FIGURES 1 and 2, however, certain differences will be noted in its construction as pointed out in the following discussion.

Referring to FIGURES 4 and 5, film 10 from "mill" roll 11 passes through the cutting zone where it is slit into two wide strips 18 and 19 and a narrow strip 17 between the wide strips by straight double beveled knives 15 and 16 mounted onto support bar 28 as it approaches support roll 14. Knives 15 and 16 are positioned in a side-by-side relationship with their ends projecting through the plane of travel of the film and their cutting edges essentially parallel but inclined at an angle of about 30° toward the oncoming film 10 and are also inclined away from one another to form an angle of at least 0.5 degree between their adjacent cutting planes.

After film 10 is slit, the wide strips of film 18 and 19 pass from the cutting zone over support roll 14, then are wound into "slit" rolls 20 and 21 by wind-up mandrel 23 onto cores longer than the width of the corresponding film strip. A constant tension is applied to the film as it is unwound from the "mill" roll and is wound into "slit" rolls by carefully controlling the braking action of the unwind mandrel 13 and the torque applied to the wind-up mandrel 23 by means not shown.

After being slit from film 10 by knives 15 and 16, film strip 17 is drawn away from the cutting zone under low tension and wound onto core 30 mounted on auxiliary mandrel 31 to form loose roll 29.

The low tension applied to film strip 17 is controlled by adjusting the torque applied to auxiliary mandrel 31 which is driven by means (not shown) which is independent of the means that drive wind-up mandrel 23.

To simplify the description of the apparatus of this invention, the removal of only one strip of inner trim from a mill roll of film has been shown in the accompanying figures. It should be clearly understood, however, that two or more strips of "inner trim" can be removed simultaneously from the same mill roll providing the pair of knives used to slit out each strip are properly positioned with respect to each other as has already been described.

The preferred slitting knives are straight, flat bodies, single edged, single beveled razor blades; however, if desired, double edged, or wedge shape, or hollow ground blades can be used providing they are properly positioned in the slitting machine. The cutting knives can be held in the desired cutting position by a rigid stationary holder or by a holder that is equipped to oscillate back and forth so as to make better use of a greater portion of the cutting edges of the knives.

To illustrate the usefulness of this invention, 75 "mill" rolls of coated cellophane of an average weight of about 1000 lbs. were slit at speeds up to 1500 ft./min. to produce "slit" rolls of film 6 to 28 inches wide wound onto cores $\frac{1}{16}$ inch longer than the corresponding film strip mounted on a single mandrel using a slitting apparatus somewhat similar to that shown in FIGURE 1. This was accomplished by slitting out strips of "inner trim" $\frac{1}{16}$ inch wide from between the wider strips being wound into "slit" roll and removing the "inner trim" from the slitting zone by use of vacuum lines each of which had its entrance end within one inch of the slitting site of the strip of "inner trim" which it removed. The two slitting knives used to slit out each strip of "inner trim" were single edged, single beveled razor blades (beveled at 3½%) having their unbeveled sides adjacent and inclined away from each other at a total angle of four degrees (each inclined 2° from perpendicular).

Since the use of a single mandrel simplified the slitting operation considerably for the slitting operator, the productivity of the slitting machine during the test was 3% higher than the productivity of the usual type of slitting machine equipped with two wind-up mandrels.

Although the slitting process of this invention has been shown to be especially useful for removing strips of fragile regenerated cellulose film of $\frac{1}{16}$ inch in width from the cutting zone of the slitting machine by means other than the wind-up mandrel, it should not be construed that the invention is limited to any particular film type, or to any particular width of inner trim or to the use of any particular means for removing the "inner trim" from the cutting zone.

The use of the apparatus of this invention makes it possible and practical to slit non-fibrous films at high speed while removing "inner trim" from the slitting zone of the slitting apparatus under tension lower than the tension being applied to the neighboring film strips. Among the various reasons why this is desirable are the following:

(1) To remove narrow inner lanes of weak or otherwise defective film.

(2) To remove narrow inner lanes of excess film not needed to complete the "slit" roll width schedule.

(3) To remove narrow inner lanes of film for bulk packaging.

(4) To remove narrow inner strips of film from between wider film strips so that the wider strips can be wound into "slit" rolls by a single mandrel onto cores of greater length than the width of the corresponding film strip.

(5) To remove narrow inner strips of film by means independent of the wind-up mandrel.

(6) To remove narrow inner strips of film by means which subjects the film strip to a fluctuating tension.

What is claimed is:

1. An apparatus for slitting and trimming a continuous tensioned web into wide and interior narrow strips comprising, in combination, a source of supply for the web; a wind-up mandrel on which said wide strips are wound; a grooved support roll in which the raised portion between adjacent grooves is under one-inch in width and the same width as said narrow strip, said roll being transversely disposed to said web and over which said web is passed under tension; adjacent cutting knives the cutting edges of which project into the path of travel of the web and into the adjacent grooves of said support roll in close proximity to said raised portion so as to form a cutting zone, said knives inclined away from each other to form an angle of at least 0.5 degree between their adjacent cutting planes, and means other than said wind-up mandrel for removing the narrow strip of web passing between said adjacent knives under a tension lower than the tension applied to said wide strips.

2. The apparatus of claim 1 wherein said web is regenerated cellulose film.

3. The apparatus of claim 1 wherein said cutting knives are single edged, single beveled razor blades.

4. The apparatus of claim 1 wherein said strip removing means is a vacuum line.

5. An apparatus for slitting and trimming a continuous tensioned non-fibrous film into wide and interior narrow strips comprising in combination, a source of supply for the film; a single wind-up mandrel on which said wide strips are wound; a grooved support roll in which the raised portion between adjacent grooves is under one-inch in width and the same width as said narrow strip, said roll being transversely disposed to said film and over which said film is passed under tension; two single edged, single beveled razor blades positioned with their unbeveled sides adjacent, the cutting edges of which are essentially parallel to each other and to the path of travel of the film and which project into the path of travel of the film and into the adjacent grooves of said support roll in close proximity to said raised portion so as to form a cutting zone, said blades inclined away from each other such that the total angle between the two adjacent cutting planes is within the range of 0.5 to 4 degrees, a vacuum line positioned in close proximity to the razor blades which removes the strip of film passing between said razor blades under a tension lower than the tension applied to said wide strips.

References Cited in the file of this patent

UNITED STATES PATENTS

| | | |
|---|---|---|
| 478,975 | Leonhard | July 12, 1892 |
| 1,980,382 | Evans et al. | Nov. 13, 1934 |
| 2,286,675 | Gibbons | June 16, 1942 |
| 2,309,469 | Marcuse | Jan. 26, 1943 |
| 2,837,155 | Cundiff et al. | June 3, 1958 |

FOREIGN PATENTS

| | | |
|---|---|---|
| 174,143 | Germany | July 31, 1906 |